F. KERIAN.
BEATER FOR THRESHERS.
APPLICATION FILED MAR. 20, 1914.
1,133,970.
Patented Mar. 30, 1915.
2 SHEETS—SHEET 2.
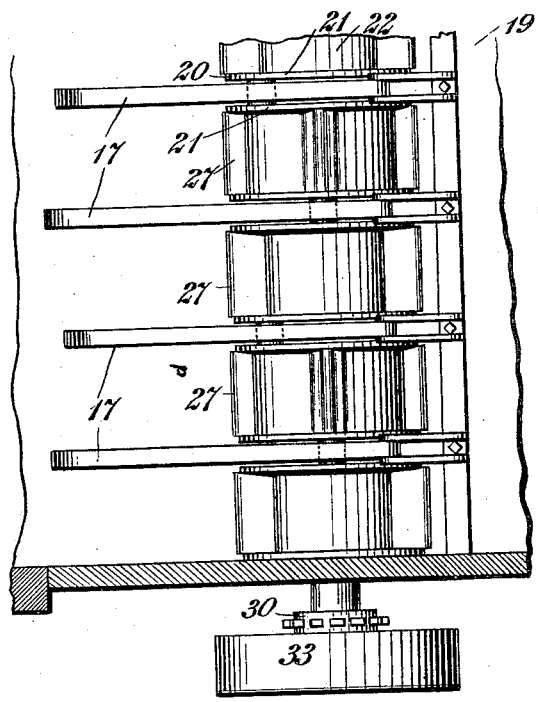
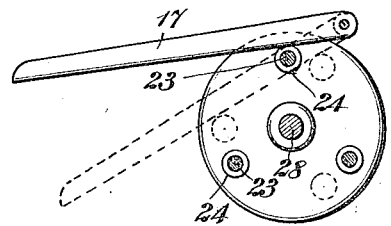
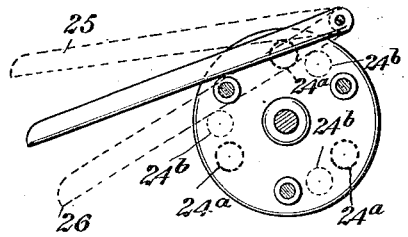
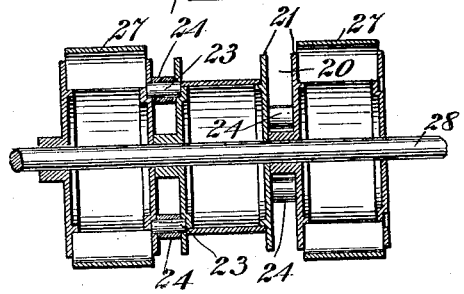
WITNESSES
George L. Blume.
E. B. Marshall
INVENTOR
Frank Kerian
BY
ATTORNEYS

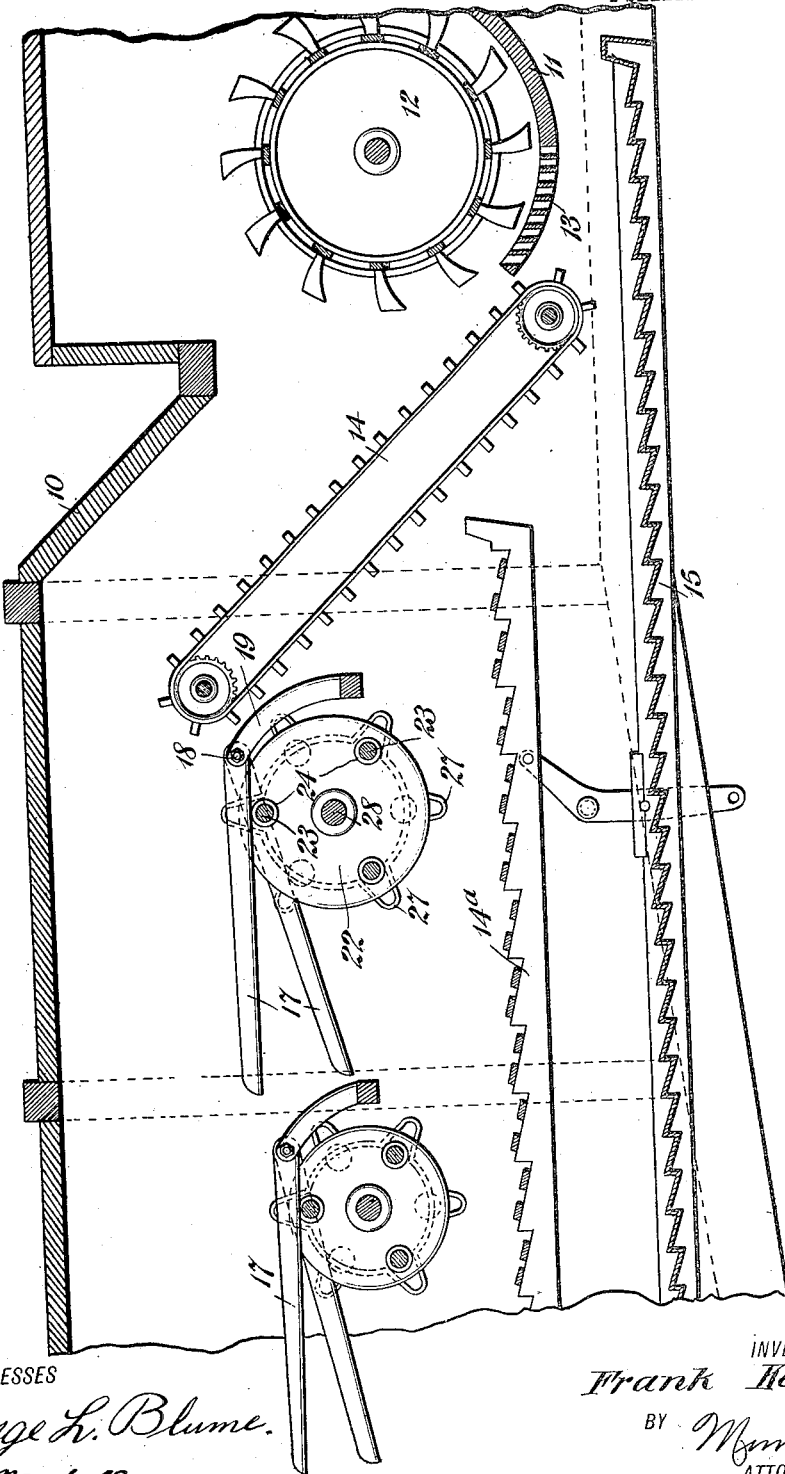

UNITED STATES PATENT OFFICE.

FRANK KERIAN, OF GRAFTON, NORTH DAKOTA.

BEATER FOR THRESHERS.

1,133,970.   Specification of Letters Patent.   Patented Mar. 30, 1915.

Application filed March 20, 1914. Serial No. 826,033.

*To all whom it may concern:*

Be it known that I, FRANK KERIAN, a citizen of the United States, and residing in Grafton, in the county of Walsh and State of North Dakota, have invented a new and Improved Beater for Threshers, of which the following is a full, clear, and exact description.

My invention has for its object to provide a beater for thresher machines which is disposed above the grain pan and the straw rack, the beater being constructed with a drum having annular grooves in which are journaled rollers which engage and reciprocate pivoted beater sticks which are prevented from lateral movement by the sides of the annular grooves.

The drum has annular ribs between the grooves for engaging the straw to free the grain.

Additional objects of the invention will appear in the following specification in which the preferred form of my invention is disclosed.

In the drawings similar reference characters refer to similar parts in all the views in which Figure 1 is a sectional elevation of a portion of a thresher showing how my improvement is used; Fig. 2 is a sectional plan view of my improvement; Fig. 3 is a sectional view of my beater drum; and Figs. 4 and 5 are sectional views showing how the beater sticks are raised periodically by the rollers disposed in annular grooves in the beater drum.

By referring to the drawings it will be seen that the thresher 10 is constructed with the usual concave 11 and theshing cylinder 12, the straw passing from the concave 11 over the rack 13 to the straw carrier 14 which is operated in the usual manner and which conveys the straw a distance above the straw rack 14$^a$. Over this straw rack 14$^a$ there are pivoted one or more beater sticks 17, the beater sticks 17 being fulcrumed at 18 to the brackets 19. The straw is deposited on the beater sticks 17 by the straw carrier 14. These beater sticks 17 are disposed in the annular grooves 20, the sides of which are formed by the circular flanges 21 on the beater drum 22. Secured to the flanges 21 and extending across the annular grooves 20 there are studs 23 on which rollers 24 are mounted, the beater sticks 17 resting on one or more of these rollers 24 so that with the rotation of the drum 22 the beater sticks 17 will be raised periodically from their normal position which is downwardly and rearwardly above the straw rack 14. In Fig. 4 I show a beater stick which has been raised to its uppermost position by one of the rollers 24 and in Fig. 5 I show in full lines a beater stick during its upward movement, the dotted lines 25 showing the position of the beater stick when it has been fully raised by one of the rollers 24 and the dotted rollers 24$^a$ showing the position of the rollers when the beater stick 25 is at its uppermost position. The dotted lines 26 indicate the position of the beater stick when it is at its lowermost position and the dotted lines 24$^b$ show the positions of the rollers 24 when the beater stick 26 is at its lowermost position. Disposed between the circular flanges 21 and extending radially from the drum 22 there are ribs 27 for engaging the straw and assisting the movement of the straw rearwardly of the straw rack 14.

I prefer to dispose the rollers 24 in such a manner that one of the beater sticks 25 will be raised when its neighboring beater sticks are permitted to fall against the straw by the movement of the rollers 24 which are disposed in the grooves in which the beater stick moves. This arrangement of the rollers 24 is indicated in Fig. 4 of the drawings.

With the rotation of the drum 22 the beater sticks will raise the straw to shake out the grain and even when the straw is damp the beater sticks 17 spread the straw and free the grain. One or more drums 22 with their beater sticks may be used as desired. The drums 22 are rotated in any suitable manner.

Having thus described my invention I claim as new and desire to secure by Letters Patent:

1. In a beater for threshers, a straw rack, a drum disposed above the straw rack, the drum having an annular groove, a pivoted beater stick disposed downwardly and rearwardly in said groove, and a member or members in the groove for raising the beater stick substantially to a horizontal position.

2. In a beater for threshers, a drum having two circular flanges spaced apart to form an annular groove therebetween, a pivoted beater stick disposed in the grooves, a member in the groove for engaging the beater stick for operating the latter with the rotation of the drum, and radial ribs on the drum at each side of the annular groove.

3. In a beater for threshers, a straw rack, a drum disposed above the straw rack, the drum having an annular groove, a beater stick pivoted above the straw rack and disposed downwardly and rearwardly in said groove, and means for raising the beater stick periodically to a horizontal position.

4. In a beater, a straw carrier, a drum disposed in the rear of the straw carrier, the drum having annular grooves and pivoted beater sticks, the pivoted beater sticks being substantially straight and being disposed rearwardly and in the grooves, and members in the grooves for supporting the beater sticks substantially at an incline of fifteen degrees from a horizontal position, and for raising the beater sticks periodically to a horizontal position.

5. In a beater for threshers, a drum having an annular groove and radial ribs at the sides of the groove, a pivoted beater stick disposed in the groove and over the axis of the drum, and a member in the groove for engaging the beater stick for operating the latter with the rotation of the drum.

In witness whereof I have hereunto signed my name to this specification in the presence of the two subscribing witnesses.

FRANK KERIAN.

Witnesses:
 D. M. UPSHAW,
 F. A. MOORE.

Copies of this patent may be obtained for five cents each, by addressing the "Commissioner of Patents. Washington, D. C."